United States Patent
December

(10) Patent No.: US 6,312,576 B1
(45) Date of Patent: *Nov. 6, 2001

(54) MULTILAYER ELECTRODEPOSITED COMPOSITION

(75) Inventor: Timothy S. December, Rochester, MI (US)

(73) Assignee: BASF Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/476,154

(22) Filed: Dec. 30, 1999

Related U.S. Application Data

(63) Continuation-in-part of application No. 09/217,917, filed on Dec. 21, 1998, now Pat. No. 6,165,336.

(51) Int. Cl.$^7$ .............................. C25D 13/12; C08L 63/00
(52) U.S. Cl. ........................ 204/484; 204/493; 525/481; 525/510
(58) Field of Search ..................................... 204/484, 506, 204/507, 493; 525/481, 510

(56) References Cited

U.S. PATENT DOCUMENTS

| | | | |
|---|---|---|---|
| 4,484,994 | 11/1984 | Jacobs, III et al. | 204/181 |
| 4,720,569 | * 1/1988 | Tominaga | 560/26 |
| 4,882,090 | * 11/1989 | Batzill et al. | 252/511 |
| 5,203,975 | 4/1993 | Richardson | 204/181.1 |
| 5,356,669 | 10/1994 | Rehfuss et al. | 427/407.1 |
| 5,474,811 | 12/1995 | Rehfuss et al. | 427/407.1 |
| 5,543,084 | 8/1996 | Kinlen et al. | 252/500 |
| 5,559,195 | 9/1996 | McGee et al. | 525/383 |
| 5,576,063 | 11/1996 | Briggs et al. | 427/386 |
| 5,605,965 | 2/1997 | Rehfuss et al. | 525/100 |
| 5,639,554 | 6/1997 | McGee et al. | 428/423.1 |
| 5,639,828 | 6/1997 | Briggs et al. | 525/208 |
| 5,665,433 | 9/1997 | Moussa et al. | 427/377 |
| 5,726,246 | 3/1998 | Rehfuss et al. | 525/100 |
| 5,853,809 | 12/1998 | Campbell et al. | 427/407.1 |
| 6,048,443 | * 4/2000 | December et al. | 204/506 |
| 6,165,338 | * 12/2000 | December et al. | 204/506 |
| 6,231,738 | 5/2001 | December | 204/484 |

FOREIGN PATENT DOCUMENTS

| | | | |
|---|---|---|---|
| WO87 02717 A | | 7/1987 | (WO) . |
| WO99 57213 A | | 11/1999 | (WO) . |

OTHER PUBLICATIONS

International Search Report for PCT/US 00/30558 in English, Feb. 2001.

December, Application No. 09/464,431 entitled "Electrocoat Resin Compositions Containing Carbamate Functional, Dec. 1999 Resins Having One Or More Quaternary Ammonium Groups And At Least One Carbamate Functional Reactive Additive", BASF's docket No. IN–5350, pp. 1–24, No Date Available.

December, Application No. 09/464,432 entitled "Cured Multilayer Coated and Process for its Production" BASF's Docket No. IN–5359, pp. 1–47.

December, Application No. 09/467,256 entitled Pigment Dispersants having Anionic Functionality for use in Anodic Electrocoat Compositions BASF,s Docket No. IN–5212, Dec. 1999.

* cited by examiner

Primary Examiner—Kathryn Gorgos
Assistant Examiner—Thao Tran
(74) Attorney, Agent, or Firm—Mary E. Golota

(57) ABSTRACT

The present invention provides a multilayer film composition wherein at least two layers of the multilayer film composition are applied via electrophoretic deposition processes. In a preferred embodiment, the first layer of the multilayer film composition is a conductive film layer applied by a cationic electrodeposition process with a second layer applied directly to the conductive first layer via a cathodic electrodeposition process. Preferably, the second layer of the cathodic electrocoat coating composition comprises a carbamate functional cathodic resin.

11 Claims, No Drawings

MULTILAYER ELECTRODEPOSITED COMPOSITION

FIELD OF THE INVENTION

The invention provides a multilayer film composition wherein at least two or more layers are applied via electrodeposition and a process for making the multilayer film composition. This application is a continuation in part of pending U.S. patent application Ser. No. 09/217,917, filed Dec. 21, 1998 now U.S. Pat. No. 6,165,336 entitled "Cathodic Electrocoat Having a Carbamate Functional Resin" all of which is hereby incorporated by reference and upon which priority is claimed.

BACKGROUND OF THE INVENTION

The coating of electrically conductive substrates by electrophoretic deposition processes, or electrocoat or ecoat, is a well-known and important industrial process. The electrodeposition of primers to metal substrates used for automotive bodies is widely used in the automotive industry. In the electrodeposition of primers, a conductive article, typically metal, is immersed in a bath of a primer composition of an aqueous emulsion of film forming polymer and acts as one electrode in the electrodeposition process. An electric current is passed between the article and acts as a counter-electrode in electrical contact with the aqueous emulsion, until a desired thickness of coating is deposited on the article. In a cathodic electrocoating process, the article to be coated is the cathode and the counter-electrode is the anode. In an anodic process, the article to be coated is the anode.

In traditional automotive processes, the electrodeposited first layer is typically followed by spray application of a second coating composition, often a primer surfacer type coating or the like. It would be advantageous if the second coating could be electrodeposited. The electrodeposition process offers several advantages over spray application processes. For example, electrocoat processes typically have lower solvent emissions, reduced operating costs, higher effective paint utilization, and more uniform coating thickness. However, the surface to be coated must be conductive for electrodeposition to occur. Eventually, the electrocoated surface becomes nonconductive due to the insulative build up of the polymeric film. The insulating nature of the polymeric coating ensures a uniform film build and makes the process self limiting.

The prior art has thus sought a multilayer coating composition wherein at least two layers are applied by electrophoretic deposition processes, preferably wherein a first electrodeposited layer is subsequently overcoated with a second electrodeposited layer.

Streitberger, Beck and Guder disclosed multilayer electrocoatings in which the first layer was modified with conducting carbon blacks. (*Proc. XIXth FATIPEC Congress, Aachem* 1988, Vol. 2, 177–89) The epoxy based cathodically electrodeposited layer had specific resistance values which were greater than the unpigmented films. Additions of conducting black maintained the self-limiting nature of the electrocoating process. The imparted conductivity made the overcoating possible in a second electrocoat process.

U.S. Pat. No. 4,968,399 discloses a multiple electrocoating process comprising coating once or more on a substrate a first electrocoating composition, coating a second electrocoating composition on the uncured first electrocoated composition and then curing all electrodeposited coatings. The first electrodeposited coating is an aqueous dispersion containing micro gel particles having an electric charge that is specially prepared. The second electrocoat composition comprises an anionic or cationic film forming aqueous resin (C) and a thermosetting agent (D) that is self-crosslinked with said aqueous resin (C).

However, this method appears to be disadvantageous due to the use of the conductive micro gel particles.

U.S. Pat. No. 5,104,507 discloses an electrodeposition method wherein a conductive substrate is first coated by means of an anodic electrodeposition process, then subjected to thermal curing, and then subjected to a cathodic electrodeposition process. The anodic electrodeposition process is carried out until the coating insulates the substrate at which point the coating process stops. The curing step lowers the dielectric strength of the anodically deposited coating, thereby allowing the substrate to accept a cathodically deposited topcoat. The patent expressly teaches that the advantageous results of the disclosed invention cannot be obtained via the use of a cured cathodically electrodeposited first coating overcoated with an anodically electrodeposited second coating.

U.S. Pat. No. 5,203,975 discloses an electrocoating process in which a layer of a clear cathodic electrocoating composition is electrocoated over a layer of a conductive composition and cured. The conductive composition is an electrically conductive cathodic electrocoating composition containing film forming binder and pigment in a pigment to binder ratio of about 1:100 to 100:100, wherein the pigment comprises an electrically conductive pigment of silica which is either amorphous silica or a silica containing material, the silica being in association with a two dimensional network of antimony containing tin oxide crystallites in which the antimony content ranges from about 1–30% by weight of the tin oxide. However, such particular silica containing materials are commercially disadvantageous.

U.S. Pat. No. 5,223,106 discloses an electrophoretic coatable sealant composition for use in assembling automotive bodies comprising an adhesive material selected from the group consisting of epoxys, urethanes, epoxyurethane hybrids, acrylics, epoxy-acrylic hybrids, polyvinylchlorides and mixtures thereof and a conductive filler in an amount such that the sealant composition will accept electrophoretic deposition of a primer composition yet preserve the adhesive properties of the sealant composition.

Finally, U.S. Pat. No. 5,275,707 discloses a method of coating a metal article by forming a first electrodeposition coating layer having varistor properties, and then forming a second electrodeposition coating layer on said first electrodeposition coating layer by an electrodeposition coating method by use of an anionic or cationic electrodeposition coating while applying a voltage exceeding the varistor voltage.

Thus, the prior art has failed to provide a process for making a multilayer electrodeposited coating composition having advantageous application and performance properties.

It is thus an object of the invention to provide a multilayer coating composition wherein at least two successively applied layers are applied by electrophoretic deposition processes and the multilayer coating composition has advantageous properties.

SUMMARY OF THE INVENTION

These and other objects have unexpectedly been obtained with the use of the process of the invention. The process of the invention utilizes a cathodically electrodeposited first coating composition overcoated with a cathodically electrodeposited second coating. The first coating composition is overcoated with the second coating composition only after the first coating composition is subjected to an amount of energy effective to cause the first coating to become conductive. The second coating composition comprises a carbamate functional cathodic resin.

More particularly, the invention provides a method of making a multilayer electrodeposited composition, the method comprising applying a first coating composition by electrophoretic deposition to a substrate to make a coated substrate, subjecting the coated substrate to an amount of energy effective to cause the coated substrate to become a conductive coated substrate, applying a second coating composition to the conductive coated substrate by electrophoretic deposition to make a multicoated substrate, and subjecting the multicoated substrate to conditions sufficient to result in the cure of the second coating composition so as to make a cured multicoated substrate, wherein the second coating composition is a cathodic electrocoat coating composition comprising an aqueous dispersion of a polymer (a) having a plurality of carbamate functional groups, said polymer represented by randomly repeating units according to the formula:

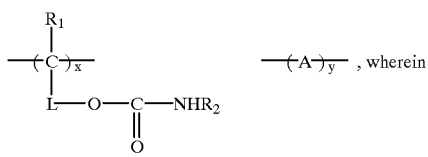

$R_1$ represents H or $CH_3$, $R_2$ represents H, alkyl, or cycloalkyl, L represents a divalent linking group, A represents repeat units comprising at least one repeat unit having a pendent cationic salting site, x represents 10 to 90 weight %, and y represents 90 to 10 weight %.

DETAILED DESCRIPTION OF THE INVENTION

The first coating composition of the invention may be any ionic functional coating composition, which upon exposure to sufficient energy, will result in a conductive coating or coated substrate. Preferably, the first coating composition will be a cathodic electrocoat composition.

Particularly preferred conductive cathodic electrocoat compositions are those disclosed in U.S. Pat. No. 4,882,090 and U.S. Pat. No. 4,988,420, both of which are entirely incorporated herein by reference.

Suitable cationic resins are cationic amine-modified epoxy resins which are the reaction products of polyepoxides, and amines selected from the group consisting of primary amines, secondary amines, tertary amines, salts thereof, and mixtures thereof. Optionally, polyfunctional alcohols, polycarboxylic acids, polyamines, and/or polysulfides may also be used in admixture with the polyexpoxides and amines.

Water dispersible products are obtained after neutralization with one or more acids.

Suitable polyepoxides are those containing at least two epoxide groups per molecule. Preferred are those compounds which contain two epoxy groups in the molecule and have a number average molecular weight of at least 750, preferably from 400 to 500. Most preferred epoxy compounds are polyglycidyl ethers of polyphenols prepared from polyphenols and epihalohydrins. Preferred polyphenols are bisphenol A and bisphenol F and 1,1-bis(4-hydroxyphenyl)-n-heptane. Also suitable are phenolic novolak resins.

Preferred epoxy compounds also include polyglycidyl ethers of polyhydric alcohols, such as ethylene glycol, diethylene glycol, bis-(4-hydroxycyclohexyl)-2,2-propane, and the like.

It is also possible to use polyglycidyl esters of polycarboxylic acids, such as glycidyl adipate and glycidyl phthalate.

Finally, it is also possible to use hydantoin epoxides, epoxidized butadiene and polyepoxy compounds which are obtained by epoxidizing an olefinically unsaturated alicylic compound.

Suitable amines for use in the most preferred conductive cationic first coating composition of the invention are one or more amines selected from the group consisting of primary amines, secondary amines, tertiary amines, salts thereof, and mixtures thereof. Secondary amines and the salts thereof are most preferred.

Preferably, the amine is a water soluble compound. Suitable examples include but are not limited to mono- and dialkylamines, such as methylamine, ethylamine, dimethylamine, methylbutylamine and the like. Likewise suitable are alkanolamines such as methylethanolamine, diethanolamine and the like. It is also possible to use dialkylaminoalkylamines such as dimethylaminoethylamnine, diethylaminopropylamine, dimethylaminopropylamine and the like. In most cases, low molecular weight amines are most preferred.

Polyamines having primary and secondary amino groups can be reacted with the epoxy groups in the form of their ketamines. The ketimines are prepared from the polyamines in a known manner.

The amines can also contain other groups, but these groups should not interfere with the reaction of the amine with the epoxy group, nor cause the reaction mixture to gel. Examples of such amines are hdyroxylamine and the like.

The charges required for water-dilutability and electrical deposition can be produced by protonation with watersoluable acids (for example, boric acid, formic acid, lactic acid, and the like), or alternatively, by reacting the oxirane groups with amine salts, preferably, tertiary amine salts.

Most preferred amines are tertiary amines, such as dimethylethanolamine, triethylamine, trimethylamine, triisopropylamine and the like.

Optionally, the polyepoxides and amines may be reacted with polyfunctional alcohols, polycarboxylic acids, polyamines, and/or polysulfides/

Suitable polyols include diols, triols and higher polymeric polyols, such as polyester polyols, polyether polyols and the like.

Polyalkylene ether polyols suitable for use are those of the formula:

wherein R is H or a lower alkyl radical, with or without various substituents, n is 2 to 6, and m is 3 to 50 or higher. Exanples are poly(oxytetramethylene) glycols and poly (oxyethylene) glycols. The preferred polyalkylene ether polyols are poly(oxytetramethylene) glycols having a number average molecular weight of 350 to 1000.

Polyester polyols may also be used. Suitable examples are those prepared by polyesterification of organic polycarbonate acids or anydrides thereof with organic polyols which contain primary hydroxyl groups. Aliphatic or aromatic dicarboxylic acids and diols are preferred as the polycarboxylic acids and polyols. Diols used include alkylene glycols such as ethylene glycol and the like and glycols such as cyclohexanedimethanol. The acid component may be carboxylic acids or anhydrides having from 2 to 18 carbons in the molecule. Examples are phthalic acid, isophthalic acid, tetrahydrophthalic acid, adipic acid, azelaic acid, sebacic acid, maleic acid, glutaric acid and the like, as well as the anhydrides thereof.

Also suitable for reaction with the polyepoxides and amines are polyester polyols which are derived from lactones. These polyols are obtained via reaction of an ε-caprolactone with a polyol. Materials of this type are described in U.S. Pat. No. 3,169,945. Most preferably, such compounds will have a terminal hydroxyl group and recurring polyester segments derived from the lactone.

Also suitable for reaction with the polyepoxides and amines are aliphatic and/or alicylic polyfimctional alcohols or carboxylic acids having a molecular weight of below 350. Preferably, such compounds will have a branched aliphatic chain, most preferably a chain having at least one neo structure. Examples include diols such as ethylene glycol, diglycol, dipropylene glycol, dibutylene glycol, triglycol, 1,2-propane diol, 2,2-dimethyl1,3-propanediol, 2-methyl-2-ethyl-1,3-propanediol, 1,2-butanediol, 2-ethyl-1,4-butanediol, 2,2-diethyl-1,3-butanediol, butene-2-diol-1,4, 1,2-pentanediol, 3-methyl-1,5-pentanediol, 1,6-hexanediol, 2-ethyl-1,3-hexanediol, 2,5-dimethyl-2,5-hexanediol, 1,3-octanediol, 4,5-nonanediol, 2,10-decanediol, 2-hydroxyethyl hydroxyacetate, 2,2-dimethyl-3-hydroxypropyl2,2-dimethylhydroxypropionate, 2-methyl-2-propyl-3-hydroxypropyl 2-methyl-2-propylhydroxypropionate, 4,4'-methylenebiscyclohexanol, and 4,4'-isopropylidenebiscyclobexanol. Most preferred diols are 2,2-dimethyl-1,3-propanediol, 3-methyl-1,5-pentanediol, 2,2-dimethyl-3-hydroxypropyl 2,2-diemethylhydroxylpropionate and 4,4'-isopropylenebiscyclohexanol.

Illustrative carboxylic acids are those such as oxalic acid, malonic acid, 2,2-dimethylnalonic acid, succinic acid, glutaric acid, adipic acid, hexahydroxphthalic acid, maleic acid, fumaric acid, pimelic acid, suberic acid, azelaic acid, sebacic acid, itaconic acid, citraconic acid, mesaconic acid, and glutaconic acid.

Also suitable for reaction with the polyepoxides and amines are dicarboxylic acids such as 2,2-dimethylmalonic acid, hexahydrophthalic acid, and dimeric fatty acids such as dimeric linoleic acid.

Suitable polyamines for use in the reaction between the polyepoxides and amines are those prepared by reaction of primary diamines and monoepoxides.

Finally, other compounds which may be used in the reaction between the polyepoxides and amines are polyfunctional SH compounds, polyphenols, and polyurethanes.

The binders used in the conductive cationic first coating composition can be conventionally crosslinked by addition of crosslinking agents or converted into self-crosslinking systems by chemical modification. A self-crosslinking system can be obtained by reacting the binder with a partially blocked polyisocyanate which has on average one free isocyanate group per molecule and whole blocked isocyanate groups only become unblocked at elevated temperatures. Suitable crosslinlding agents are almost all at least bifimctional compounds which react with oxirane groups, for example amino resins, polyalcohols, polyphenols, polycarboxylic acids, polycarboxylic anhydrides, polycarboxamides, polyarnines, polyisocyanates, phenolic resins, and mixtures thereof.

The crosslinking agents are generally used in an amount of from 5 to 60, preferably 20 to 40, percent by weight, based on the binder.

The conductive cationic first coating composition may further contain additives such as coalescent solvents, pigments, surface-active agents, crosslinking catalysts, antioxidants, fillers, antifoam agents, and the like.

The conductive cationic first coating composition must contain at least one material which can impart conductivity to the first coating composition upon exposure to an effective amount of energy.

Most preferably, the cationic first coating composition will contain one or more carbon black pigments having an iodine absorption of 870–930 mg/g, a specific surface area (BET/$N_2$) of 850–1,000 $m^2$/g, a pore volume (DBP) of 330–390 mV100 g and an average particle size of 25–35 nm.

A most preferred carbon black for use in the cationic conductive first coating composition will have an iodine absorption of 900 mg/g, a specific surface area (BET/$N_2$) of 950 $m^2$/g, a pore volume (DBP) of 360 ml/100 g and an average particle size of 30 nm. Commercially available examples of suitable carbon blacks include KETJEN-BLACK EC marketed by Akzo Chemie.

Such conductive carbon blacks are preferably used in an amount of from 1.5 to 5.1% by weight, based on total solids.

The conductive cationic first coating composition of the invention is placed in a bath suitable for dipping the articles to be coated. Once the article is immersed in the bath, an electrical voltage is applied between an anode and the article connected as cathode, and coating of the substrate occurs. Upon conclusion of coating, the coated article is removed from the bath, rinsed off and subjected to an amount of energy effective to cause the coated article or substrate to become conductive, i.e, capable of carrying a charge sufficient to allow overcoating of the first coated substrate with a second electrodeposited coating composition, Typically, the coated article or substrate will be placed in a heated oven for a time sufficient to effect substantial, most preferably, complete, crosslinning and cure of the first coating composition. However, it will be appreciated that in some first coating composition, shrinkage due to less than complete cure may be sufficient to result in a conductive coated substrate. Suitable energy sources include ovens, IR units and blackwall energy sources. Traditional ovens are most preferred.

Once conductive, the substrate coated with the first coating composition may be overcoated with the second coating composition via electrodeposition. Preferably, the second coating composition will be a cathodic coating composition and most preferably, the coating composition will comprise a carbamate functional cationic polymer or cathodic compound (a).

The polymer or compound (a) most preferably used will have at least one carbamate functional group appended to a polymer backbone, preferably a plurality of pendant carbamate functional groups.

Preferred cationic compounds (a) are those containing at least one carbamate functional group and one or more repeat units having at least one pendent cationic salting site. Examples of suitable carbamate functional resins for use in cationic electrocoat compositions are described in pending U.S. patent application Ser. No. 09/217,917, entitled "Cathodic Electrocoat Having a Carbamate Functional Resin" all of which is hereby incorporated by reference.

The most preferred cathodic compound (a) of the invention will have at least one carbamate functional group appended to a polymer backbone, preferably a plurality of pandant carbamate functional groups. It is preferred, but not necessary, that the polymer backbone to which the carbamate functional group is appended be an acrylic polymer.

The most preferred cathodic compound (a) can be prepared in a variety of ways.

One way to prepare such cathodic compounds (a) is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art. In a preferred embodiment, at least one of the ethylenically unsaturated monomers will have a pendant cationic salting group.

As used herein, the term "cationic salting site" refers to a functional group which is sufficiently basic to undergo reaction with an acid to produce a salt, which, while in an aqueous dispersion in the presence of a voltage, will undergo decomposition and facilitate the formation of a insoluble polymer which deposits on a substrate immersed in the aqueous as dispersion. Preferred cationic salting groups are amine functional groups and quaternary ammonium salts. The amine functional groups of the polymer (a) may be primary, secondary, tertiary amnino groups or quaternary ammonium salts. Quaternary ammonium salts and tertiary amines are most preferred, with quaternary ammonium salts especially preferred. Such groups may also be part of polyamines and/or alkanol amines.

The cationic salting site can be incorporated into or grafted to the cathodic compound (a) polymer backbone in a variety of ways.

For example, a carbamate fimctional acrylic monomer can be copolymerized with an ethylenically unsaturated monomer having at least one cationic salting group. The cationic salting group may be a primary, secondary, or tertiary amine functional group, or a quaternary ammonium salt, or a mixture thereof Ilustrative examples of such monomers are methacrylamide, acrylamide, dimethylaminoethyl methyacrylate, mixtures thereof, and the like. Another example of a suitable ethylenically unsaturated monomer having amino functionality is the reaction product of glycidyl methacrylate and a tertiary amine salt. Dimethylaminoethyl methacrylate is preferred.

Alternatively, as will be discussed below, a polymer having oxirane or glycidyl functionality can be made and the cationic salting group formed by reaction of the glycidyl group with an amine or a polyamine. Amines or polyamines may be used having primary, secondary, or tertiary amine groups. Tertiary amine salts may be used to form quaternary ammonium salts via reaction with the glycidyl group on the polymer backbone and are preferred.

Finally, a monomer such as glycidyl methacrylate can be polymerized with a ethylenically unsaturated carbamate functional monomer to produce a carbamate functional acrylic having pendent glycidyl functionality. A cationic salting site can be incorporated by reaction of an amine functional compound, polyamine, or tertiary amine salt with the oxirane group.

Preferred methods of preparing the cathodic compound (a) having an acrylic backbone include the following.

One or more carbamate functional monomers such as 2-carbanate ethyl methyacrylate (CEMA) may be copolymerized with at least one ethylenically unsaturated amine ftmctional compound, at least one alkyl ester of an unsaturated organic acid and at least one other ethylenically unsaturated monomer such as styrene in the presence of a suitable initiator such as an azo or peroxide initiator. Other suitable carbarnate functional monomers include those discussed above. Illustrative suitable unsaturated amine fimctional compounds are as discussed above. A preferred unsaturated amine functional compound is dimethylaminoethyl methyacrylate. Examples of suitable alkyl esters of unsaturated organic acid include ethyl acrylate, butyl acrylate, 2-ethylhexyl acrylate, butyl methyacrylate, isodecyl methyacrylate, hydroxyethyl methacrylate, hydroxypropyl methacrylate, and the like. Preferred alkyl esters are non-hydroxy functional monomers such as butyl acrylate and butylmethacrylate. A preferred monomer for use as an additional ethylenically unsaturated monomer is styrene.

In another reaction scheme, an adduct may be made from a polyisocyanate such as isophorone dilsocyanate (IPDI) or toluene diisocyanate (TDI) and a hydroxy fimctional carbanate compound such as hydroxypropyl carbamate. The resulting adduct can then be grafted onto an acrylic, epoxy or other hydroxy functional resin having suitable characteristics for use.

Another method involves a multistep reaction wherein a hydroxy carbonate may reacted with ammonia or an amine functional compound to provide a primary, secondary or tertiary carbamate functional compound. This compound is then reacted with an anhydride compound via the reaction of the hydroxy group with the anhydride ring. The carboxylic acid groups of the resulting reaction product are then reacted with the oxirane groups of a glycidyl ether of Bisphenol A. Cationic salting groups are incorporated via the reaction of an amine functional compound, such as diethanol amnine, with the glycidyl ether groups which terminate the resulting hydroxy and carbamate functional polymer.

In an alternative reaction, an isocyanate functional monomer such as unsaturated m-tetramethyl xylene isocyanate (sold by American Cyanamid as TMI®) can be copolymerized with monomers such as aikyl esters such as described immediately above such as butyl acrylate and unsaturated monomers such as styrene to produce an isocyanate functional polymer. The required cationic salting group functionality and carbamate functionality can then be grafted onto the isocyanate functional polymer by a multi-stage reaction having a first stage using a carbamate functional monomer such as hydroxypropyl carbamate followed by a second stage using an amine functional compound, i.e., primary, secondary or tertiary amine groups, most preferably an alkanol amine.

In general, the most preferred cathodic compound (a) can be represented by the randomly repeating units according to the following formula:

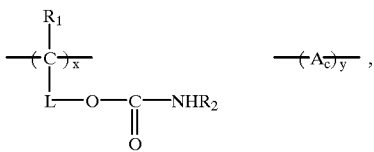

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, $A_c$ represents comprises one or more repeat unit having a pendent cationic salting site. Such repeat units may be derived from one or more ethylenically unsaturated monomers, at least one of which repeat units must have a pendent cationic salting group, preferably an amino group. As discussed above, the at least one cationic salting group may derive from the use of at least one ethylenically unsaturated monomer having at least one amino group. Alternatively, the at least one repeating unit having a pendent cationic salting site may derive from the reaction of an amine functional compound with a glycidyl group previously incorporated into the polymer.

L represents a divalent linking group and is the same as discussed above with respect to the anodic compound (a).

In an especially preferred embodiment of cathodic compound (a), cathodic compound (a) will comprise a polymer (A) which may be made via the graffing of a carbamate functional intermediate adduct (A') onto an acrylic, epoxy, or other hydroxy functional resin (A") having suitable characteristics for use as discussed below. In a most preferred reaction scheme, a carbamate functional intermediate adduct (A') may be made from the reaction of a polyisocyanate (ai) and a carbamate functional compound (aii) comprising at least one group which is reactive with isocyanate. Preferably, the compound (aii) will comprise at least one primary carbamate group.

Suitable polyisocyanates (ai) are monomeric polyisocyanates that can be aliphatic, cycloaliphatic, and/or aromatic polyisocyanates. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone; px diisocyanate. Useful aromatic diisocyanates and araliphatic diisocyanates include the various isomers of toluene diisocyanate, meta-xylylenediioscyanate and para-xylylenediisocyanate, also 4chloro-1,3-phenylene diisocyanate, 1,5-tetrabydro-naphthalene diisocyanate, 4,4'-dibenzyl diisocyanate and 1,2,4-benzene triisocyanate can be used. In addition, the various isomers of $\alpha,\alpha,\alpha',\alpha'$-tetramethyl xylene diisocyanate can be used. Biurets of isocyanates such as DESMODUR® N1OO from Bayer may also be useful. Preferably, polyisocyanate (ai) is a diusocyanate. Isophorone diisocyanate is most preferred.

Suitable examples of such isocyanate reactive, carbamate functional compounds are commercially available hydroxy functional carbamate compounds such as hydroxypropyl carbamate, hydroxybutyl carbamate, and mixtures thereof. Hydroxypropyl carbamate is most preferred. It is also within the scope of the invention to use isocyanate reactive compounds containing groups convertible to carbamate in place of the isocyanate reactive, carbamate functional compounds. Use of the term "convertible to carbamate" refers to groups which have the capability of forming carbamate groups, preferably primary carbamate groups after reaction with the polyisocyanate is completed. Examples of groups convertible to carbamate include cyclic carbonate groups, (i.e., the reaction product of glycidol and $CO_2$ then reacted with ammonia to form a carbamate group), and epoxy groups (i.e., reaction of the epoxy with $CO_2$ to form cyclic carbonate followed by reaction with ammonia).

The isocyanate reactive, carbamate functional compound (aii) is reacted with the polyisocyanate (ai) to provide an intermediate compound (A') having at least one carbarnate group, preferably at least one primary carbamate group, and at least one isocyanate group.

In a particularly preferred embodiment, the isocyanate reactive carbamate functional compound (aii) will be reacted with the polyisocyanate (ai) under reaction conditions sufficient to produce both the intermediate (A') having both carbamate functionality and isocyanate functionality as well as a carbamate functional reactive additive (B) which is free of isocyanate functionality. In this embodiment, both (B) and (A') are the reaction products of a single reaction. Accordingly, (B) may be described as being generated "in situ" during the production of intermediate (A'). Examples of suitable reaction conditions include a mole equivalent ratio of NCO to hydroxyl of from 2/1 to 2/2, preferably from 1.2 to 1.8, and most preferably from 1.3 to 1.7. Other reaction conditions to consider include temperature and catalyst type and level. However, it will be appreciated that in situ reactive additive (B) is an optional element with respect to the instant invention.

Suitable catalysts which may be used for the multistep production of the polymer (A) include those described below with respect to the curable coating compositions (I) and (II). Preferred catalysts are those such as Lewis acids or tin salts. A most preferred catalyst is dibutyl tin dilaurate. Preferably, the catalyst will be used in an amount of from 0.001 to 1%, and most preferably from 0.05 to 0.15%, based on solids.

In situ generated reactive additive (B) will have a number average molecular weight of from, 250 to 2000 and most preferably from 400 to 800. Preferably, reactive additive (B) will have a degree of carbamate functionality equal to the degree of isocyanate functionality of polyisocyanate (ai), i.e., the polyisocyanate (ai) will preferably be diblocked for the reactive additive (B) when polyisocyanate (ai) is a diisocyanate.

The carbamate functional/isocyanate functional intermediate (A') is then grafted onto an acrylic, epoxy or other hydroxy functional resin (A") having suitable characteristics for use to form the most preferred embodiment of cathodic compound (a). The grafting of the intermediate (A') must occur via reaction with the at least one isocyanate group of (A') with a reactive group of (A").

Most preferably, the carbamate functional/isocyanate functional intermediate (A') will be grafted onto a hydroxy functional compound (A") comprising epoxy groups. The grafting of (A') will thus occur via reaction between a hydroxyl group and the at least one isocyanate group of (A'). Preferably, the hydroxy fimctional compound comprising epoxy groups will be an epoxy functional resin. As discussed below, reaction of the epoxy group with a tertiary amine in the presence of an acid is a preferred method of incorporating the most preferred one or more quaternary ammonium groups.

Suitable epoxy containing polymers are resinous polyepoxide or polymeric resinous materials containing two or more 1,2-epoxy groups per molecule. Preferred polyepoxides are polyglycidyl ethers of polyhydric phenols such as bisphenol A. These can be produced by etherification of a polyphenol with an epihalohydrin or dihalohydrin such as epichlorohydrin or dichlorohydrin in the presence of alkali. Suitable polyhydric phenols include bis-2,2-(4-hydroxyphenyl)propane, bis- 1,1-(4-hydroxyphenyl)ethane, bis(2-hydroxynaphthyl)methane and the like.

Other useful polyepoxide compounds are those made from novolak resins or similar polyhydroxyphenol resins.

Also suitable are polyglycidyl ethers of polyhydric alcohols such as ethylene glycol, propylene glycol, diethylene glycol and triethylene glycol.

There can also be used polyglycidyl esters of polycarboxylic acids which are produced by the reaction of epichlorohydrin or a similar epoxy compound with an aliphatic or aromatic polycarboxylic acid such as succinic acid and terepthalic acid.

Most preferably, the epoxy-containing compound to which the carbamate functional intermediate is grafted onto will be the reaction product of a liquid epoxy such as diglycidyl ether of bisphenol A (DGEBA) and bisphenol A. Particularly preferred examples of such epoxy containing compounds may be characterized as upgraded epoxy resins having epoxy equivalent weights of approximately 1100. Suitable liquid epoxys are GY2600, commercially available from Ciba Geigy and Epon® 828, conmmercially available from Shell Chemical Company.

Thus, a most preferred cathodic compound (a) will comprise both polymer (A) and optional carbamate functional reactive additive (B) generated during the production of polymer (A), most specifically during the production of intermediate (A'). Reactive additive (B) will be present in the resin composition of the invention in an amount of from 1 to 20, preferably from 2 to 15 and most preferably from 3 to 10 percent, based on the total resin solids. The cathodic compound (a) comprising both polymer (A) and polycarbamate functional reactive additive (B) that is free of isocyanate functionality has been found to provide unexpected benefits in both application and performance.

In this most preferred embodiment of cathodic compound (a), polymer (A) comprises one or more quaternary ammonium groups which serve as cationic salting sites. While it most preferred that polymer (A) comprise one or more quaternary ammonium groups, other cationic salting groups may also be present in polymer (A). Examples of other suitable cationic salting groups are amine functional groups such as primary, secondary, tertiary amino groups or mixtures thereof.

Polymer (A) may be further characterized by a meq of cationic salting group, preferably a quaternary ammonium group, of from about 0.1 to 2.0 meq N/gram polymer (A), preferably from about 0.2 to 1.5 meq N/gram polymer (A), and most preferably from about 0.3 to 0.6 meq N/gram polymer (A). It is preferred that at least 80% of the total number of cationic salting groups be quaternary ammonium groups, more preferably from 90 to 100% of the total number of cationic salting groups, and most preferably from 95 to 100% of the total number. The remaining cationic salting groups can be as described above, with secondary amino groups being most preferred.

A preferred method of incorporating the necessary cationic salting group, i.e., a quaternary ammonium group into the polymer (A), is by reaction of a glycidyl group with one or acid salts of one or more tertiary amines. The acid salt will preferably be preformed via the mixing of one or more tertiary amines and one or more acids. Other amines or polyamines may be used having primary, secondary, tertiary amine groups, or mixtures thereof. However, it will be appreciated that quaternary ammonium groups are an especially preferred element of polymer (A) of cathodic compound (a). Suitable acids are carboxylic acids such as lactic acid and acetic acid.

Epoxy functionality will most preferably be present in polymer (A) as a result of the foregoing reaction scheme wherein an isocyanate/carbamate functional intermediate (A') is grafted onto a hydroxy/epoxy functional compound.

Alternatively, epoxy functionality can be incorporated into an acrylic resin via the polymerization of a monomer such as glycidyl methacrylate with an ethylenically unsaturated carbamate functional monomer to produce a carbamate functional acrylic having pendent glycidyl functionality. Subsequently, a cationic salting site, i.e., a quaternary ammonium compound can be incorporated by reaction of a tertiary amine with the oxirane group in the presence of an acid.

In the absence of an epoxy group, the cationic salting site can be incorporated into or grafted to the polymer (A) backbone in a variety of ways.

For example, a carbamate functional acrylic monomer can be copolymerized with an ethylenically unsaturated monomer having at least one cationic salting group. One or more carbamate functional monomers such as 2-carbamate ethyl methyacrylate (CEMA) may be copolymerized with at least one ethylenically unsaturated amine functional compound, at least one alkyl ester of an unsaturated organic acid and at least one other ethylenically unsaturated monomer such as styrene in the presence of a suitable initiator such as an azo or peroxide initiator. Other suitable carbamate functional monomers include those discussed above.

The cationic salting group of the ethylenically unsaturated monomer may be a primary, secondary, or tertiary amine functional group, or a quaternary ammonium salt, or a mixture thereof. Most preferably, the salting group will be a quaternary ammonium salt. Illustrative suitable unsaturated amine functional compounds are methacrylamide, acrylamide, dimethylaminoethyl methyacrylate, mixtures thereof, and the like. A preferred unsaturated amine functional compound is dimethylaminoethyl methyacrylate.

Examples of suitable alkyl esters of unsaturated organic acid include ethyl acrylate, butyl acrylate, 2-ethylhexyl acrylate, butyl methyacrylate, isodecyl methyacrylate, hydroxyethyl methacrylate, hydroxypropyl methacrylate, and the like. Preferred alkyl esters are nonhydroxy functional monomers such as butyl acrylate and butylmethacrylate. A preferred monomer for use as an additional ethylenically unsaturated monomer is styrene.

A preferred example of a suitable ethylenically unsaturated monomer having amino functionality is the reaction product of glycidyl methacrylate and the acid salt of a tertiary anmne. Dimethylaminoethyl methacrylate is most preferred as the tertiary amine.

The cationic compound (a) will be preferably reacted with an acid for use in the second cathodic coating composition. This reaction may be termed "neutralization or "acid-salted" and specifically refers to the reaction of the pendent amino groups with an acidic compound in an amount sufficient to neutralize enough of the basic amino groups to impart water-dispersibility to compound (a). Illustrative acid compounds include phosphoric acid, propionic acid, acetic acid, lactic acid, or citric acid.

Curable coating composition (I) will further comprise a curing agent (b). Curing agent (b) is a compound having a plurality of functional groups that are reactive with the active hydrogen-containing groups on compound (a). Such reactive groups include active methylol or methylalkoxy groups, isocyanate groups, siloxane groups, cyclic carbonate groups, and anhydride groups. Examples of compounds suitable for use as curing agent (b) include aminoplast resins, phenol/formaldehyde adducts, blocked isocyanate curing agents, tris(alkoxy carbonylamino) triazines (available from Cytec Industries under the tradename TACT) and mixtures thereof. Aminoplast resins and phenol/ formaldehyde adducts are most preferred, with blocked isocyanates being disfavored. Suitable aminoplast resins are amine/aldehyde condensates, preferably at least partially etherified, and most preferably fully etherified. Melamine and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are water miscible or water soluble.

Suitable cathodic compound (a) and curing agent (b) intended for use in the second coating composition will be dispersed in an aqueous medium. The term "dispersion" as used within the context of the present invention is believed to be a two-phase translucent or opaque aqueous resinous system in which the resin is in the dispersed phase and water the continuous phase. It will be appreciated that in this case, curing agent (b) may or may not be soluble in water. The average particle size diameter of the resinous phase is about 0.05 to 5.0 microns, preferably less than 2.0 microns.

The concentration of cathodic compound (a) and curing agent (b) in the aqueous medium is, in general, not critical, but ordinarily the major portion of the aqueous dispersion is water. The aqueous dispersion of the second coating composition will usually contain from about 3 to 50 percent, preferably 10 to 40 percent by weight resin solids. Aqueous resin concentrates which are to be fther diluted with water, generally range from 10 to 30 percent by total weight solids.

The second coating composition may, and most preferably will contain one or more catalyst (c) to facilitate the reaction between compound (a) and curing agent (b). For example, a strong acid catalyst may be utilized to enhance the cure reaction. It will be appreciated that such catalysts may be blocked or unblocked. Such catalysts are well-known in the art and include, for example, p-toluenesulfonic acid, dinonylnaphthalene disulfonic acid, dodecylbenzenesulfonic acid (DDBSA), phenyl acid phosphate, monobutyl maleate, butyl phosphate, and hydroxy phosphate ester. Other catalysts useful in the composition of the invention include Lewis acids, zinc salts, and tin salts. Illustrative Lewis acids or zinc salts are zinc nitrate, zinc acetate, bismuth octoate, dibutyltin dilaurate, and the like. Such catalysts will typically be used in an amount of from 0.1 to 3.0 weight percent, based on the resin solids, preferably from 0.5 to 2.0 weight percent, based on the resin solids. Preferred catalysts for use in curable coating composition (I) are Lewis acids such as zinc nitrate and blocked and unblocked acid catalysts such as DDBSA. It is also within the scope of the instant invention that curable coating composition (I) be catalyzted by acid available from curable coating composition (II) such as discussed below.

In an especially preferred embodiment, the second coating composition will further comprise an optional reactive additive (C) such as is described in U.S. Patent Application entitled "Cathodic Electrocoat Having A Carbarnate Functional Resin And A Carbamate Functional Reactive Additive", Ser. No. 09/464,432.

Compounds suitable for use as reactive additive (C) are those having at least one primary carbamate group and at least one alkyl radical selected from the group consisting of straight chain alkyl groups of more than 10 carbons, branched alkyl groups of from 5 to 30 carbons, and mixtures thereof.

As used herein, "primary carbamate group" refers to the functional group having the structure

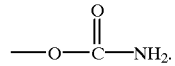

Thus, the primary carbamate group of the invention may be defined as a terminal or pendent carbamate group. Although compounds suitable for use as reactive additive (C) may comprise more than one primary carbamate group, it is most preferred that such compounds have one primary carbamate group.

In addition to the at least one primary carbamate group, compounds suitable for use as reactive additive (C) will further comprise at least one alkyl group selected from the group consisting of branched alkyl groups having from 5 to 30 total carbons, straight chain alkyl groups of more than 10 carbons, and mixtures thereof.

As used herein, the term "branched" refers to both lateral branches and forked branches. Lateral refers to a branch of two small chains at the end atom of a carbon chain. Forked refers to a branch of two small chains in the middle of a carbon chain. For the purposes of the instant invention a carbon chain may be from 1 to 15 carbons, more preferably from 1 to 8 and most preferably from 1 to 3. The total number of carbon atoms in the branched alkyl group is obtained by adding the total number of carbons in the main carbon chain + the number of carbons in all alkyl chains extending from the main carbon chain.

It will be appreciated that the main carbon chain may be from 1 to 25 carbons, preferably from 1 to 10, most preferably from 1 to 4. Most preferably, the main chain will be an aliphatic carbon chain free of unsaturation. Although the at least one branched alkyl group may comprise from 5 to 30 total carbons, more preferably, it will have from 5 to 15 carbons and most preferably from 8 to 12 carbons.

Finally, it will be appreciated that suitable "at least one alkyl groups" for use in reactive additive (C) will be substantially free of functional groups that are reactive with one or more of components (A) and (B). Thus, the at least one alkyl group selected from the group consisting of branched alkyl groups having from 5 to 30 total carbons, straight chain alkyl groups of more than 10 carbons, and mixtures thereof, will be free of hydroxyl groups and the like.

An example of an especially suitable at least one branched alkyl group is

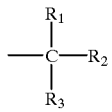

wherein $R_1$, $R_2$, and $R_3$ are alkyl groups of from 1 to 10 carbons each, preferably aliphatic groups of from 1 to 10 carbons. Most preferably, $R_1$, $R_2$, and $R_3$ will total from 8 to 12 carbons with at least one of $R_1$, $R_2$, and $R_3$ being a methyl group.

In another suitable branched alkyl group of the same structure, one of $R_1$, $R_2$, and $R_3$, may be hydrogen, with the other substituent groups being alkyl groups of from 1–10 carbons, preferably aliphatic groups of from 1 to 10. An example of such a group is

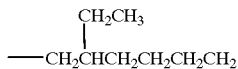

In this instance, the above structure is understood to be an example of lateral branching.

In a particularly preferred embodiment, the at least one branched alkyl group will comprise

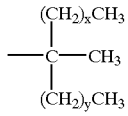

wherein x+y=5 carbons.

Alternatively, the compound suitable for use as reactive additive (C) may include a straight chain alkyl group of more than 10 carbons, preferably more than 15 carbons and most preferably more than 18. Examples of suitable straight chain, aliphatic alkyl groups include 1-eicosanyl, 1-octadecyl, 1-arachidyl, 1-dodecyl, 1-decyl, and 1-octyl, and the like. It is most preferred that compounds suitable for use as reactive additive (C) include at least one group which is a branched alkyl group such as described above.

Compounds suitable for use as reactive additive (C) may further include heteroatoms such as O and N, most preferably O. Such heteroatoms may be incorporated in the form of groups such as esters, hydroxyls, ether, carboxyls, mixtures thereof and the like. Preferred are esters, hydroxyls, and mixtures thereof. Most preferably, a compound will comprise at least one hydroxyl group and one ester group in addition to the carbamate functional group and the at least one alkyl group. As indicated above, such heteroatoms may not be present in the branched alkyl group nor in the straight alkyl chain group of more than 10 carbons.

Particularly suitable compounds for use as reactive additive (C) are those having the formula:

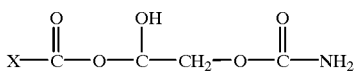

wherein X is a branched alkyl radical of from 5 to 30 total carbons, more preferably from 5 to 15 total carbons and most preferably from 8 to 12 total carbons.

A more preferrred compound for use as reactive additive (C) is that having the formula:

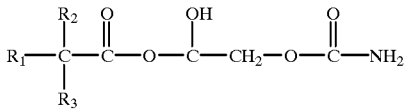

wherein $R_1$, $R_2$, and $R_3$ are each alkyl groups of from 1 to 10 carbons, especially compounds wherein $R_1$, $R_2$, and $R_3$ total from 8 to 12 carbons with at least one of $R_1$, $R_2$, and $R_3$ being a methyl group.

The most preferred compound for use as reactive additive (C) is that having the formula:

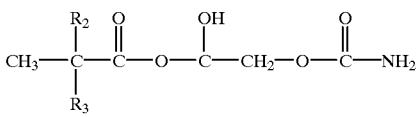

wherein $R_2$ and $R_3$ are respectively $-(CH_2)_xCH_3$ and $-(CH_2)_yCH_3$ wherein x+y=5.

Besides water, the aqueous medium of the second coating composition may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene, ethylene glycol butyl ether, ethyleneglycol dimethyl ether, or mixtures thereof. A small amount of a water-inmiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

The second coating composition may further contain conventional pigments such as titanium dioxide, ferric oxide, carbon black, aluminum silicate, precipitated barium sulfate, aluminum phosphomolybdate, strontium chromate, basic lead silicate or lead chromate. The pigment-to-resin weight ratio can be important and should be preferably less than 50:100, more preferably less than 40:100, and usually about 10 to 30:100. Higher pigment-to-resin solids weight ratios have also been found to adversely affect coalescence, flow, and/or coating performance.

Second coating composition can contain optional ingredients such as wetting agents, surfactants, defoamers, antioxidants, UV absorbers, light stabilizers, and so forth. Examples of surfactants and wetting agents include alkyl imidazolines such as those available from Ciba-Geigy Industrial Chemicals as Amine C®, acetylenic alcohols available from Air Products and Chemicals as Surfynol® 104. These optional ingredients, when present, constitute from about 0 to 20 percent by weight of resin solids, and preferably from 0.1 to 1.0 percent by weight of resin solids.

Plasticizers are optional ingredients because they promote flow. Examples are high boiling water immiscible materials such as polyalkylene polyols, such as polypropylene polyols or ethylene or propylene oxide adducts of nonyl phenols or bisphenol A. Plasticizers can be used and if so are usually used at levels of about 0 to 15 percent by weight resin solids.

In general, sufficient water is added so that the dispersion of second coating composition has a solids content of more than 20, preferably more than 30% by weight.

The second coating composition should have an electroconductivity from 0.1 to 5 mS/cm, preferably from 0.5 to 3 mS/cm. When this value is too low, it is difficult to obtain a film thickness having desired protective and other functions. Conversely, if the composition is too conductive, problems such as the dissolution of substrate or counter electrode in the bath, uneven film thickness or poor water or corrosion resistance may arise.

The second coating composition will be applied on the coated substrate comprising the conductive first coating composition by an electrodeposition coating process at a nonvolatile content of 10 to 25% by weight to a dry film thickness of 15 to 35 microns. Electrodeposition of the coating preparations according to the invention may be carried out by any of a number of processes known to those skilled in the art. The deposition may be carried out on all electrically conducting substrates, for example metal, such as steel, copper, aluminum and the like.

After application, the second coating composition may be cured at an elevated temperature, depending upon the nature of particular base resins. The preferred cathodic second coating compositions will generally cure at 20 minutes at 310° F. or less (metal temperature), preferably at 20 minutes at 200° F. (metal temperature).

What is claimed is:

1. A method of making a multilayer electrodeposited composition, comprising, applying a first coating composition by electrophoretic deposition to a substrate to make a coated substrate, subjecting the coated substrate to an amount of energy effective to cause the coated substrate to become a conductive coated substrate, applying a second coating composition to the conductive coated substrate by electrophoretic deposition to make a multicoated substrate, and subjecting the multicoated substrate to conditions sufficient to result in the cure of the second coating composition so as to make a cured multicoated substrate, wherein the second coating composition comprises a cathodic electrocoat coating composition comprising an aqueous dispersion of a polymer (a) having a plurality of carbamate functional groups, said polymer represented by randomly repeating units according to the formula:

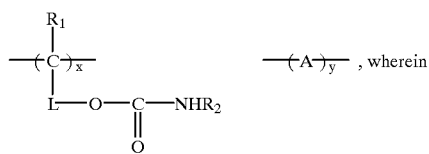

$R_1$ represents H or $CH_3$, $R_2$ represents H, alkyl, or cycloalkyl,

L represents a divalent linking group,

A represents repeat units comprising at least one repeat unit having a pendent cationic salting site, x represents 10 to 90 weight %, and y represents 90 to 10 weight %.

2. The method of claim 1 wherein the first coating composition comprises a cationic amine-modified epoxy functional resin.

3. The method of claim 2 wherein the cationic amine-modified epoxy functional resin is a polyglycidyl ether of a polyphenol.

4. The method of claim 2 wherein the modifying amine is selected from the group consisting of primary amines, secondary amines, tertiary amines, salts thereof, and mixtures thereof.

5. The method of claim 1 wherein the first coating composition comprises one or more carbon black pigments having an iodine absorption of 870–930 mg/g, a specific surface area (BET/$N_2$) of 850–1,000 m²/g, a pore volume (DBP) of 330–390 ml/100 g and an average particle size of 25–35 nm.

6. The method of claim 1 wherein the first applied coating composition is subjected to a thermal bake.

7. The method of claim 1 wherein the first applied coating composition is subjected to an IR source.

8. The method of claim 1 wherein the second coating composition is a carbamate functional acrylic resin.

9. The method of claim 1 wherein the second coating composition comprises one or more quaternary ammonium groups as salting sites.

10. The method of claim 1 wherein the second coating composition further comprises a carbamate functional reactive additive (C).

11. The method of claim 10 wherein the carbamate functional reactive additive (C) comprises at least one primary carbamate group and at least one alkyl radical selected from the group consisting of straight chain alkyl groups of more than 10 carbons, branched alkyl groups of from 5 to 30 carbons, and mixtures thereof.

* * * * *